(12) United States Patent
Tahmasbi et al.

(10) Patent No.: US 10,420,116 B1
(45) Date of Patent: Sep. 17, 2019

(54) FAST JOINT TRAFFIC-TO-PILOT RATIO AND SPATIAL SCHEME DETECTION

(71) Applicant: QUALCOMM Incorporated, San Diego, CA (US)

(72) Inventors: Amir Tahmasbi, San Diego, CA (US); Jun Hyok Cho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/946,606

(22) Filed: Apr. 5, 2018

(51) Int. Cl.
*H04B 1/10* (2006.01)
*H04W 72/08* (2009.01)
*H04L 25/02* (2006.01)
*H04B 7/06* (2006.01)
*H04B 7/0456* (2017.01)

(52) U.S. Cl.
CPC ........ *H04W 72/082* (2013.01); *H04B 7/0486* (2013.01); *H04B 7/0697* (2013.01); *H04L 25/0224* (2013.01)

(58) Field of Classification Search
None
See application file for complete search history.

(56) References Cited

U.S. PATENT DOCUMENTS

| 8,306,165 | B2 | 11/2012 | Huang et al. |
| 9,136,953 | B2 | 9/2015 | Yoo et al. |
| 9,564,955 | B2 | 2/2017 | Lee et al. |
| 2016/0219599 | A1 | 7/2016 | Lee et al. |
| 2017/0245286 | A1 | 8/2017 | Rahmati et al. |

OTHER PUBLICATIONS

Lee H., et al., "Interference Cancellation based on Blindly-Detected Interference Parameters for LTE-Advanced UE", IEEE Mobile and Wireless Networking Symposium, 2015, pp. 3143-3148.
International Search Report and Written Opinion—PCT/US2019/020820—ISA/EPO—May 14, 2019 (175012WO).
Qiangze C et al., "Detection-Assisted Interference Parameter Estimation and Interference Cancellation for LTE-Advanced System", 2016 IEEE International Conference on Network Infrastructure and Digital Content(IC-NIDC), IEEE, Sep. 23, 2016 (Sep. 23, 2016), pp. 229-233, XP033116706, DOI: 10.1109/ICNIDC.2016.7974570, ISBN: 978-1-5090-1245-9, [retrieved on Jul. 10, 2017], Abstract Sections 3.2, 3.3.

*Primary Examiner* — Kevin C. Harper
*Assistant Examiner* — Derrick V Rose
(74) *Attorney, Agent, or Firm* — Qualcomm IP Dept.; James Hunt Yancey, Jr.

(57) ABSTRACT

Methods, systems, and devices for wireless communications are described. A wireless device such as a User Equipment (UE) in communication with a serving cell, may perform interference cancellation from an interfering cell. A UE may determine a rank of an unprecoded channel matrix associated with the interfering cell, estimate a traffic-to-pilot ratio (TPR) for an interfering transmission, based in part on a unit-norm property of a plurality of precoding matrix hypotheses for the interfering transmission, calculate respective log-likelihood functions for joint demodulation of the serving and interfering cell transmissions, select a subset of the plurality of precoding matrix hypotheses, and perform joint demodulation of the transmissions to obtain a set of demapped symbols, by assuming a uniform distribution hypothesis for the serving cell transmission, and a Gaussian distribution hypothesis for the interfering transmission.

30 Claims, 9 Drawing Sheets

FAST JOINT TRAFFIC-TO-PILOT RATIO AND SPATIAL SCHEME DETECTION

BACKGROUND

The following relates generally to interference cancellation performed by a UE in communication with a serving cell, and more specifically to joint traffic-to-pilot ratio and spatial scheme detection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include Fourth Generation (4G) systems such as Long-Term Evolution (LTE) systems, LTE-Advanced (LTE-A) systems, or LTE-A Pro systems, and Fifth Generation (5G) systems which may be referred to as New Radio (NR) systems. These systems may employ technologies such as Code Division Multiple Access (CDMA), Time Division Multiple Access (TDMA), Frequency Division Multiple Access (FDMA), Orthogonal Frequency Division Multiple Access (OFDMA), or Discrete Fourier Transform-spread-OFDM (DFT-s-OFDM). A wireless multiple-access communications system may include a number of base stations or network access nodes, each simultaneously supporting communication for multiple communication devices, which may be otherwise known as User Equipment (UE).

In some wireless communication systems, a UE served by a cell of a serving base station may experience interference from another cell or base station. For example, a UE may experience high interference from a non-serving cell as the UE moves from the serving cell towards the non-serving cell but prior to a handover being accomplished. The UE may experience dropped calls due to increased bit error rates, lower data speeds, etc. Interference cancellation algorithms have been deployed in some wireless communication systems, which jointly demodulate the received symbols from both the serving cell and the interfering cell. Existing interference cancellation algorithms require knowledge of dynamic interference parameters pertaining to the serving and interfering cell. However, in order to limit network signaling load, the dynamic interference parameters may be unknown for the interfering cell. Current techniques for interference cancellation utilize blind estimation of the parameters by hypothesis testing, which is computationally expensive, especially with regards to detecting the interfering cell's traffic-to-pilot ratio (TPR), number of transmitting layers, and the precoding matrix.

SUMMARY

The described techniques relate to improved methods, systems, devices, or apparatuses that support fast joint traffic-to-pilot ratio and spatial scheme detection. In some cases, to facilitate optimization of interference cancellation, a User Equipment (UE) may leverage the unit-norm (or unit normal) property of an interfering cell's precoding matrix, and eliminate the effect of the interfering cell's channel matrix. In some cases, if the interfering cell's channel matrix is of full rank (rows and columns are linearly independent), the effects of the interfering cell's precoding matrix may be eliminated, for example, by taking the expected value of the Frobenius norm of the mathematical expression of the received symbols. The rank of the channel matrix may indicate the number of independent data streams (layers) which can be transmitted simultaneously. In some cases, the UE may determine the rank of the interfering cell's channel matrix. In some cases, upon establishing that the interfering cell's channel matrix is of full rank, the UE may obtain a closed-form solution for the interferer's TPR based on assuming the unit-norm property of the interfering cell's precoding matrix.

In some cases, using the estimated TPR, an algorithm may evaluate the log-likelihood function of the observed symbols for a decreased number of Precoding Matrix Indicator (PMI) hypotheses, as compared to current techniques. For example, instead of evaluating log-likelihood functions for multiple TPR and spatial scheme hypotheses, the UE may only need to evaluate the log-likelihood function for the spatial scheme hypotheses, since the TPR has been estimated. In some examples, 1-2 PMIs resulting in the largest likelihood values may be selected and reported together with the estimated TPR. In some cases, the new algorithm may serve to decrease the number of CPU cycles during hypothesis testing, thus lowering power consumption.

A method of interference cancellation performed by a UE in communication with a serving cell is described. The method may include determining a rank of an unprecoded channel matrix associated with an interfering cell, estimating, based at least in part on the determined rank, a TPR for an interfering transmission from the interfering cell over time and frequency resources associated with a serving cell transmission from the serving cell, wherein estimating the TPR of the interfering transmission is based at least in part on a unit-norm property of a plurality of precoding matrix hypotheses for the interfering transmission, calculating, based at least in part on the estimated TPR for the interfering transmission, respective log-likelihood functions for joint demodulation of the serving cell transmission and the interfering transmission according to the plurality of precoding matrix hypotheses, selecting a subset of the plurality of precoding matrix hypotheses based at least in part on the respective log-likelihood functions, and performing joint demodulation of the serving cell transmission and the interfering transmission to obtain a set of demapped symbols for the serving cell transmission, the joint modulation being based at least in part on a uniform distribution hypothesis for the serving cell transmission and a non-uniform distribution hypothesis (e.g., Gaussian, log-normal, or Pareto distribution hypothesis) for the interfering transmission.

An apparatus for interference cancellation performed by a UE in communication with a serving cell is described. The apparatus may include a processor, memory in electronic communication with the processor, and instructions stored in the memory. The instructions may be executable by the processor to cause the apparatus to determine a rank of an unprecoded channel matrix associated with an interfering cell, estimate, based at least in part on the determined rank, a TPR for an interfering transmission from the interfering cell over time and frequency resources associated with a serving cell transmission from the serving cell, wherein estimating the TPR of the interfering transmission is based at least in part on a unit-norm property of a plurality of precoding matrix hypotheses for the interfering transmission, calculate, based at least in part on the estimated TPR for the interfering transmission, respective log-likelihood functions for joint demodulation of the serving cell transmission and the interfering transmission according to the plurality of precoding matrix hypotheses, select a subset of the plurality of precoding matrix hypotheses based at least in part on the respective log-likelihood functions, and perform joint demodulation of the serving cell transmission and the interfering transmission to obtain a set of demapped symbols for the serving cell transmission, the joint modulation being based at least in part on a uniform distribution hypothesis for the serving cell transmission and a non-uniform distribution hypothesis for the interfering transmission.

Another apparatus for interference cancellation performed by a UE in communication with a serving cell is described. The apparatus may include means for determining a rank of an unprecoded channel matrix associated with an interfering cell, means for estimating, based at least in part on the determined rank, a TPR for an interfering transmission from the interfering cell over time and frequency resources associated with a serving cell transmission from the serving cell, wherein estimating the TPR of the interfering transmission is based at least in part on a unit-norm property of a plurality of precoding matrix hypotheses for the interfering transmission, means for calculating, based at least in part on the estimated TPR for the interfering transmission, respective log-likelihood functions for joint demodulation of the serving cell transmission and the interfering transmission according to the plurality of precoding matrix hypotheses, means for selecting a subset of the plurality of precoding matrix hypotheses based at least in part on the respective log-likelihood functions, and means for performing joint demodulation of the serving cell transmission and the interfering transmission to obtain a set of demapped symbols for the serving cell transmission, the joint modulation being based at least in part on a uniform distribution hypothesis for the serving cell transmission and a non-uniform distribution hypothesis for the interfering transmission.

A non-transitory computer-readable medium storing code for interference cancellation performed by a UE in communication with a serving cell is described. The code may include instructions executable by a processor to determine a rank of an unprecoded channel matrix associated with an interfering cell, estimate, based at least in part on the determined rank, a TPR for an interfering transmission from the interfering cell over time and frequency resources associated with a serving cell transmission from the serving cell, wherein estimating the TPR of the interfering transmission is based at least in part on a unit-norm property of a plurality of precoding matrix hypotheses for the interfering transmission, calculate, based at least in part on the estimated TPR for the interfering transmission, respective log-likelihood functions for joint demodulation of the serving cell transmission and the interfering transmission according to the plurality of precoding matrix hypotheses, select a subset of the plurality of precoding matrix hypotheses based at least in part on the respective log-likelihood functions, and perform joint demodulation of the serving cell transmission and the interfering transmission to obtain a set of demapped symbols for the serving cell transmission, the joint modulation being based at least in part on a uniform distribution hypothesis for the serving cell transmission and a non-uniform distribution hypothesis for the interfering transmission.

In some examples of the method, apparatuses, and non-transitory computer-readable medium described herein, the estimating the TPR for the interfering transmission comprises applying a complex random vector model (e.g., Gaussian, log-normal, or Pareto complex random vector model) for the interfering transmission to an observed symbol model over the time and frequency resources.

In some examples of the method, apparatuses, and non-transitory computer-readable medium described herein, the estimating the TPR for the interfering transmission comprises applying a complex random vector model for the serving cell transmission to an observed symbol model over the time and frequency resources.

In some examples of the method, apparatuses, and non-transitory computer-readable medium described herein, the estimating the TPR for the interfering transmission comprises calculating a result of a closed-form equation for the TPR, the closed-form equation applying the unit-norm property of the plurality of precoding matrix hypotheses to an observed symbol model over the time and frequency resources.

Some examples of the method, apparatuses, and non-transitory computer-readable medium described herein may further include operations, features, means, or instructions for rounding the result of the closed-form equation for the TPR to an upper bound TPR estimate, and rounding the TPR to a lower bound TPR estimate. Some examples of the method, apparatuses, and non-transitory computer-readable medium described herein may further include operations, features, means, or instructions for selecting a precoding matrix hypothesis associated with each of the upper bound TPR estimate and the lower bound TPR estimate from the plurality of precoding matrix hypotheses for the interfering transmission. Some examples of the method, apparatuses, and non-transitory computer-readable medium described herein may further include operations, features, means, or instructions for calculating, based at least in part on the upper bound TPR estimate and the lower bound TPR estimate, respective log-likelihood functions for joint demodulation of the serving cell transmission and the interfering transmission. Some examples of the method, apparatuses, and non-transitory computer-readable medium described herein may further include operations, features, means, or instructions for reporting one of the upper bound TPR estimate or the lower bound TPR estimate, and a respective precoding matrix hypothesis for the interfering transmission, based at least in part on a maximum of the respective log-likelihood functions.

In some examples of the method, apparatuses, and non-transitory computer-readable medium described herein, the performing the joint demodulation of the serving cell transmission and the interfering transmission comprises calculating, according to the uniform distribution hypothesis for the serving cell transmission and the Gaussian distribution hypothesis for the interfering transmission, second respective log-likelihood functions for joint demodulation of the serving cell transmission and the interfering transmission according to the subset of the plurality of precoding matrix hypotheses. Some examples of the method, apparatuses, and non-transitory computer-readable medium described herein may further include operations, features, means, or instructions for selecting a precoding matrix hypothesis for the interfering transmission corresponding to a maximum of the second respective log-likelihood functions.

In some examples of the method, apparatuses, and non-transitory computer-readable medium described herein, the plurality of precoding matrix hypotheses for the interfering transmission include a space frequency block coding spatial scheme, a transmit diversity spatial scheme, an open-loop spatial multiplexing spatial scheme, or a closed-loop spatial multiplexing spatial scheme.

In some examples of the method, apparatuses, and non-transitory computer-readable medium described herein, the estimating the TPR for the interfering transmission may be performed for a plurality of resource blocks over the time and frequency resources.

In some examples of the method, apparatuses, and non-transitory computer-readable medium described herein, the estimating the TPR for the interfering transmission may be based on the rank of the unprecoded channel matrix associated with the interfering cell being a full rank.

In some examples of the method, apparatuses, and non-transitory computer-readable medium described herein, a number of hypotheses in the selected subset of the plurality of precoding matrix hypotheses for the interfering transmission may be determined based at least in part on a difference between a highest of the respective log-likelihood functions and a second-highest of the respective log-likelihood functions.

Some examples of the method, apparatuses, and non-transitory computer-readable medium described herein may further include operations, features, means, or instructions for determining that a second rank of a second unprecoded channel matrix associated with a second interfering cell does not correspond to a full rank. Some examples of the method, apparatuses, and non-transitory computer-readable medium described herein may further include operations, features, means, or instructions for calculating second respective log-likelihood functions for joint demodulation of a second serving cell transmission and a second interfering transmission from the second interfering cell according to a plurality of TPR and precoding matrix hypotheses for the interfering transmission, the plurality of TPR and precoding matrix hypotheses comprising a second plurality of precoding matrix hypotheses for each of a plurality of TPR value hypotheses. Some examples of the method, apparatuses, and non-transitory computer-readable medium described herein may further include operations, features, means, or instructions for selecting a subset of the plurality of TPR and precoding matrix hypotheses for the interfering transmission based at least in part on the second respective log-likelihood functions. Some examples of the method, apparatuses, and non-transitory computer-readable medium described herein may further include operations, features, means, or instructions for performing second joint demodulation of the second serving cell transmission and the second interfering transmission to obtain a second set of demapped symbols for the second serving cell transmission.

DETAILED DESCRIPTION

Figure 1:
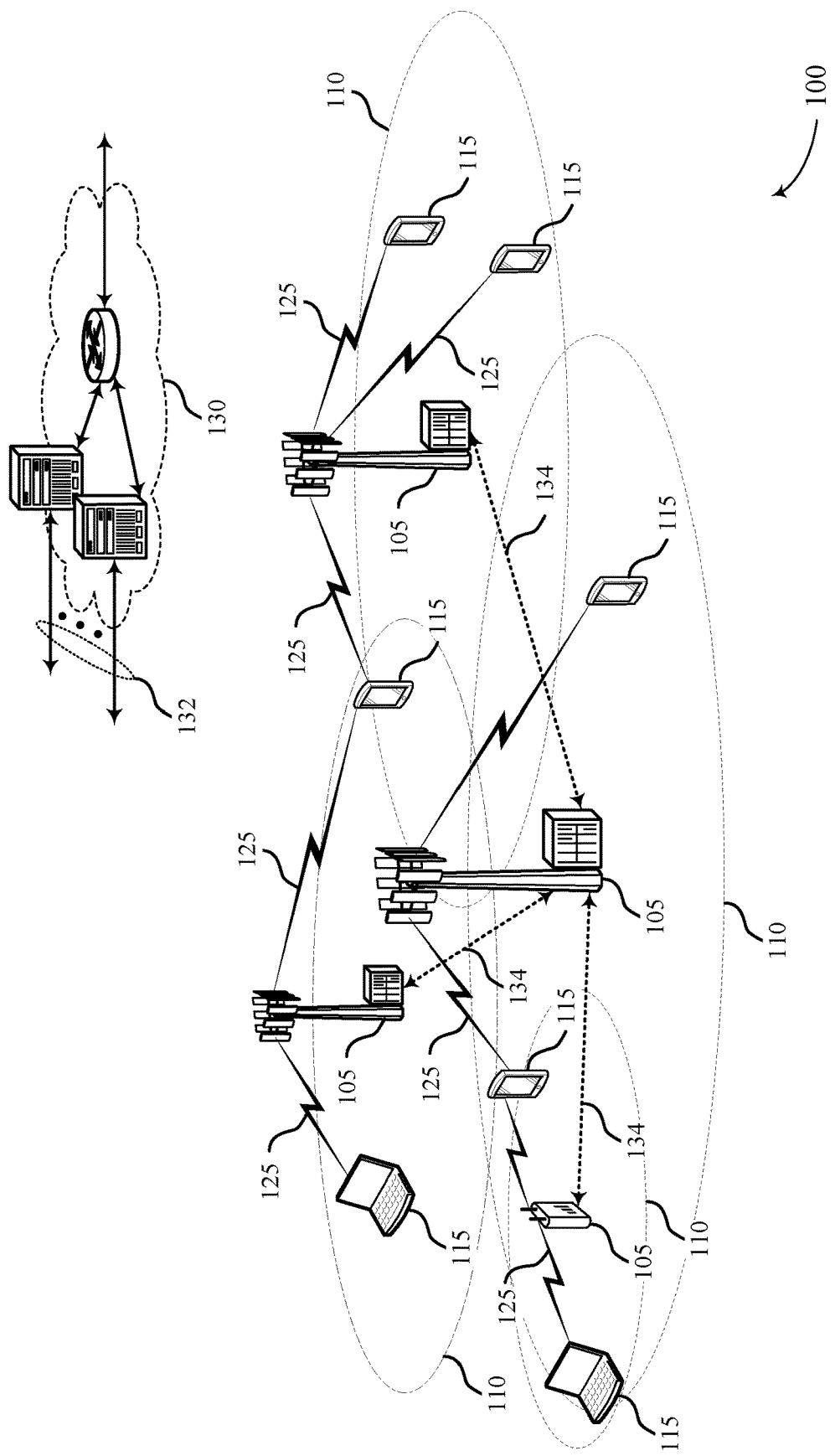
FIG. 1 illustrates an example of a system for wireless communication that supports fast joint traffic-to-pilot ratio and spatial scheme detection in accordance with aspects of the present disclosure.

In some wireless communication systems, a User Equipment (UE) served by a serving cell may experience high levels of interference from non-serving cells. For example, a UE moving from a serving cell towards a non-serving cell may experience high interference from the non-serving cell or other cells before a handover is accomplished. In some cases, this may lead to dropped calls or diminished UE performance, due to increased bit error rates. In some cases, interference cancellation algorithms may be deployed in wireless systems to jointly demodulate received symbols in downlink transmissions from both the serving cell and the interfering cell. In some cases, interference cancellation algorithms require knowledge of dynamic interference parameters, such as UE-specific Traffic-to-Pilot Ratio (TPR), the Precoding Matrix Indicator (PMI), the Rank Indicator (RI), and the modulation order. In some cases, such algorithms may be termed Network-Assisted Interference Cancellation and Suppression (NAICS).

The dynamic interference parameters of the serving cell are known to the UE through the aid of network signaling. For instance, the TPR may be decoded from the System Information Block 2 (SIB2) of the Physical Downlink Shared Channel (PDSCH). Further, the PMI may be known either explicitly by decoding Downlink Control Information (DCI) of the Physical Downlink Control Channel (PDCCH), or implicitly from Channel State Feedback (CSF). However, dynamic interference parameters of the interfering cell may not be transmitted to the UE, for instance, to limit network-signaling load. Hence, the UE may blindly estimate the dynamic interference parameters of the interfering cell based in part on the received signals. In some cases, the existing interference cancellation and equalization algorithms may be computationally expensive, especially with regards to detecting the interfering cell's TPR, number of transmitting layers, and the precoding matrix, due to reliance on blind estimation of the parameters by hypothesis testing.

In some cases, one or more sub-problems may be addressed to narrow down hypotheses testing. For instance, interference cancellation may perform four major tasks, namely: i) TPR classification ii) Spatial Scheme (SS) classification, iii) precoding classification, and iv) Modulation Order Detection (MOD), prior to joint demodulation of the received symbols from the serving and interfering cells. In some cases, detection may be performed by maximizing the posterior probability of the received data given each hypothesis. In some cases, a full-complexity Maximum A Posteriori (MAP) or Maximum Likelihood (ML) estimator may have to search over a large hypotheses space (e.g., >300 hypotheses), which may be algorithmically complex. In some cases, the TPR classification may have the highest computational complexity, and any complexity reduction in TPR classification may serve to optimize the overall performance of the first algorithm, and thus, UE performance.

To facilitate optimization of interference cancellation, a UE may leverage the unit-norm (or unit normal) property of an interfering cell's precoding matrix, and eliminate the effect of the interfering cell's channel matrix to perform fast TPR classification. In some cases, if the interfering cell's channel matrix is of full rank (rows and columns are linearly independent), the effects of the interfering cell's precoding matrix may be eliminated, for example, by taking the expected value of the Frobenius norm of the mathematical expression of the received symbols. The rank of the channel matrix may indicate the number of independent data streams (layers) which can be transmitted simultaneously. In some cases, the UE may determine the rank of the interfering cell's channel matrix. In some cases, upon establishing that the interfering cell's channel matrix is of full rank, the UE may obtain a closed-form solution for the interferer's TPR based on assuming the unit-norm property of the interfering cell's precoding matrix.

In some cases, using the estimated TPR, the UE may evaluate the log-likelihood function of the observed symbols for a decreased number of pre-coding matrix indicator (PMI) hypotheses, as compared to current techniques. For example, instead of evaluating log-likelihood functions for multiple TPR and spatial scheme hypotheses, the UE may only need to evaluate the log-likelihood function for the spatial scheme hypotheses, since the TPR has been estimated. In some examples, 1-2 PMIs resulting in the largest likelihood values may be selected and reported together with the estimated TPR. In some cases, fast TPR classification may serve to decrease the number of CPU cycles during hypothesis testing, thus lowering power consumption. In some cases, fast TPR classification may employ a Gaussian approximation for the received symbols from the serving cell and interfering cell. However, employing a Gaussian approximation for spatial scheme classification, precoding classification, or modulation order detection may reduce classification and joint demodulation performance. According to some aspects, while a non-uniform distribution hypothesis, such as a Gaussian, log-normal, or Pareto distribution hypothesis, may be used for the interfering cell, a uniform distribution hypothesis may be used for one or more of spatial scheme classification, precoding classification, or modulation order detection for the serving cell transmission.

Aspects of the disclosure are initially described in the context of a wireless communications system. Aspects of the disclosure are further illustrated by and described with reference to a process flow, flowcharts, apparatus diagrams, and system diagrams that relate to fast joint traffic-to-pilot ratio and spatial scheme detection algorithm.

FIG. 1 illustrates an example of a wireless communications system 100 that supports fast joint traffic-to-pilot ratio and spatial scheme detection in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a Personal Digital Assistant (PDA), a tablet computer, a laptop computer, or a personal computer. In some examples, a UE 115 may also refer to a Wireless Local Loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a Peer-To-Peer (P2P) or Device-To-Device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a One-to-Many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an Evolved Packet Core (EPC), which may include at least one Mobility Management Entity (MME), at least one Serving Gateway (S-GW), and at least one Packet Data Network (PDN) Gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an Access Node Controller (ANC). Each access network entity may communicate with UEs 115 through a number of other access network transmission entities, which may be referred to as a radio head, a smart radio head, or a Transmission/Reception Point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the Ultra-High Frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the High Frequency (HF) or Very High Frequency (VHF) portion of the spectrum below 300 MHz.

Wireless communications system 100 may also operate in a Super High Frequency (SHF) region using frequency bands from 3 GHz to 30 GHz, also known as the centimeter band. The SHF region includes bands such as the 5 GHz Industrial, Scientific, and Medical (ISM) bands, which may be used opportunistically by devices that can tolerate interference from other users.

Wireless communications system 100 may also operate in an Extremely High Frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ Listen-Before-Talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on Frequency Division Duplexing (FDD), Time Division Duplexing (TDD), or a combination of both.

In some examples, base station 105 or UE 115 may be equipped with multiple antennas, which may be used to employ techniques such as transmit diversity, receive diversity, Multiple-Input Multiple-Output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include Single-User MIMO (SU-MIMO) where multiple spatial layers are transmitted to the same receiving device, and Multiple-User MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), Forward Error Correction (FEC), and retransmission (e.g., Automatic Repeat Request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a System Frame Number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a Transmission Time Interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA Absolute Radio Frequency Channel Number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using Multi-Carrier Modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using Time Division Multiplexing (TDM) techniques, Frequency Division Multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or Resource Blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as Carrier Aggregation (CA) or multi-carrier operation. A UE 115 may be configured with multiple downlink Component Carriers (CCs) and one or more uplink CCs according to a carrier aggregation configuration. Carrier aggregation may be used with both FDD and TDD component carriers.

In some cases, wireless communications system 100 may utilize enhanced Component Carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In wireless communication system 100, a UE 115 may leverage the unit-norm (or unit normal) property of an interfering cell's precoding matrix to eliminate the effect of the interfering cell's channel matrix, thus optimizing interference cancellation. For instance, if the interfering cell's channel matrix is of full rank, the UE 115 may obtain a closed-form solution for the interferer's TPR based on assuming the unit-norm property of the interfering cell's precoding matrix. In some cases, using the estimated TPR, the UE 115 may evaluate the log-likelihood function of the observed symbols for a decreased number of PMI hypotheses. In some examples, instead of evaluating log-likelihood functions for multiple TPR and spatial scheme hypotheses, the UE 115 may only need to evaluate the log-likelihood function for the spatial scheme hypotheses, since the TPR has been estimated. In some examples, 1-2 PMIs resulting in the largest likelihood values may be selected and reported together with the estimated TPR, which may serve to decrease the number of CPU cycles during hypothesis testing. In some examples, Gaussian approximations may be used for the serving cell and interfering cell for an initial TPR/SS classification, while a Gaussian approximation for the interfering cell and a uniform distribution for the serving cell may be used for one or more of final TPR/SS classification (e.g., spatial scheme detection, precoding classification, etc.), or modulation order detection for the serving cell transmission.

Figure 2:
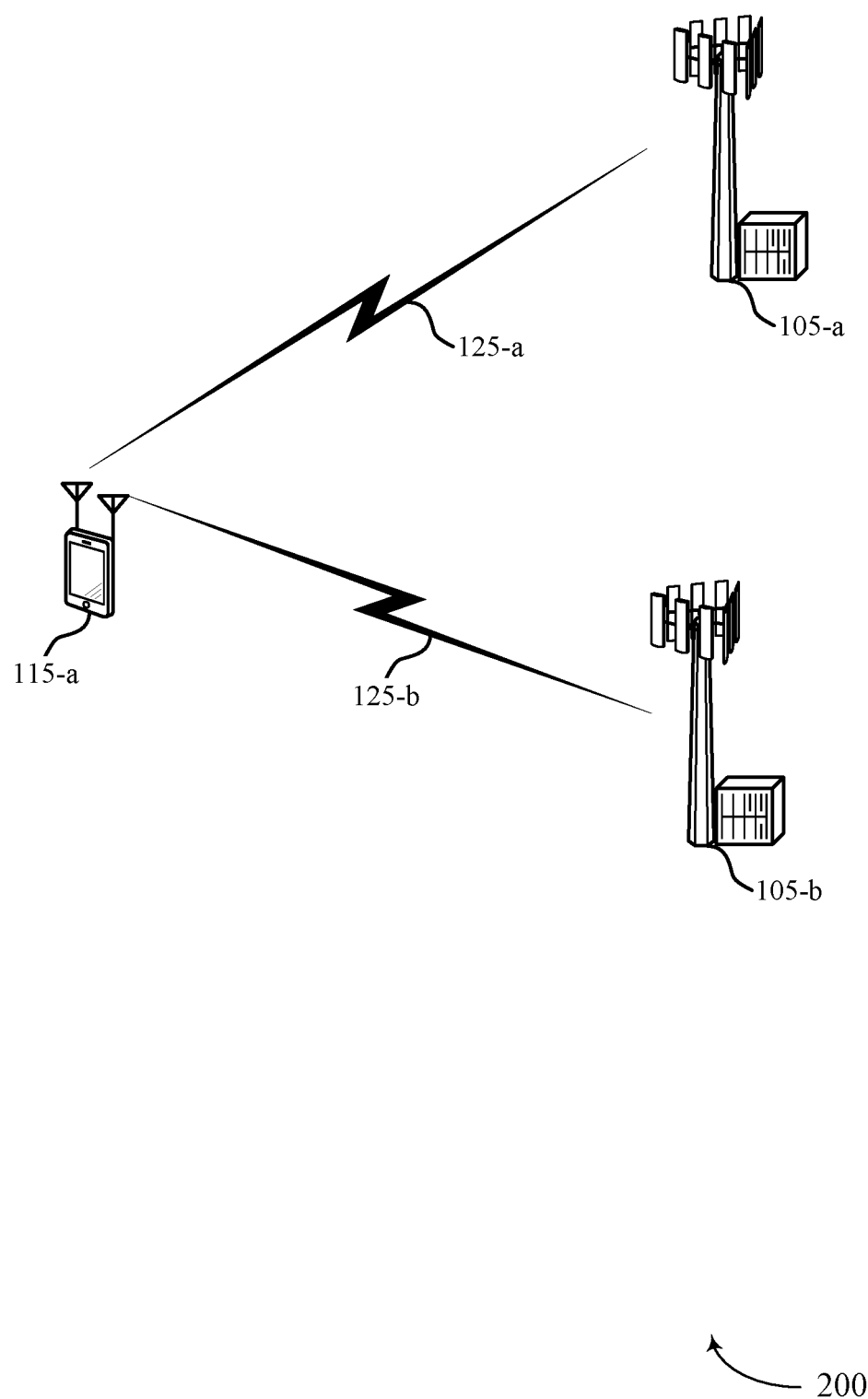
FIG. 2 illustrates an example of a wireless communications system that supports fast joint traffic-to-pilot ratio and spatial scheme detection in accordance with aspects of the present disclosure.

FIG. 2 illustrates an example of a wireless communication system 200 that supports fast joint traffic-to-pilot ratio and spatial scheme detection in accordance with aspects of the present disclosure. In some examples, wireless communication system 200 may implement aspects of wireless communication system 100. The wireless communication system 200 may include a UE 115-a, and base stations 105-a and 105-b, which may be examples of the UEs 115 and base stations 105 described with reference to FIG. 1. The UE 115-a, and base stations 105-a and 105-b may communicate using directional beams (e.g., mmW spectrum) or one or more spatial layers (not shown) over wireless communication links 125-a and 125-b, respectively. In some cases, base station 105-a may be serving UE 115-a and referred to as the serving Cell (sCell), and base station 105-b may be referred to as a neighboring cell, or an interfering Cell (iCell). It should be noted that while FIG. 2 illustrates a single iCell, there may be more than one iCell.

In some cases, UE 115-a may experience interference from base station 105-b (e.g., when operating at or close to the cell edge, or before a handover to base station 105-b is accomplished). In some cases, this may lead to dropped calls or diminished UE performance, due to increased bit error rates. In some cases, interference cancellation algorithms may be deployed in wireless communication system 200 to jointly demodulate received symbols in downlink transmissions from both the serving cell (i.e., base station 105-a) and the interfering cell (i.e., base station 105-b). In some cases, interference cancellation algorithms may require knowledge of dynamic interference parameters, such as UE-specific TPR, PMI, RI, and the modulation order. In some cases, such algorithms may be termed NAICS.

Dynamic interference parameters of base station 105-a are generally known to the UE 115-a through the aid of network signaling. For instance, the TPR may be decoded from the SIB2, which may be transmitted on the Downlink Shared Channel (DL-SCH) transport channel, mapped to the PDSCH. Further, the PMI may be known either explicitly by decoding DCI received via the PDCCH, or implicitly from CSF. However, dynamic interference parameters used for transmissions from base station 105-b may not be transmitted to the UE 115-a, for instance, to limit network-signaling load. Hence, the UE 115-a may be designed to blindly estimate the dynamic interference parameters of the interfering cell based in part on the received signals. In some cases, the existing interference cancellation and equalization algorithms may be computationally expensive, especially TPR and SS classification. Thus, any complexity reduction in TPR and SS classification may serve to optimize the overall performance of interference cancellation, and thus, performance for UE 115-a.

In some cases, TPR and SS classification may be utilized to detect the interfering cell's TPR value (TPR classification), determine the number of transmitting layers (RI detection), and detect the precoding matrix if the interfering cell is of rank 1 (PMI classification). In some cases, the unit-norm property of the precoding matrices may be utilized to eliminate the effect of interfering cell's channel matrix. For instance, if the interfering cell's channel matrix is of full rank, the effects of the interferer's precoding and channel matrices may be eliminated by taking the expected value of the Frobenius norm of the mathematical expression of the observed symbols. As a result, a closed-form solution for the interferer's TPR may be obtained which can be computed efficiently. In such cases, using the estimated TPR, UE 115-$a$ may evaluate the log-likelihood function of the observed symbols only for 5 PMI hypotheses. Finally, 1-2 PMIs resulting in the largest likelihood values may be selected and reported together with the estimated TPR for final TPR/SS pair classification. In some cases, the interfering cell's channel matrix may not be full rank. In such cases, hypothesis testing over the TPR/SS search space may be utilized.

In some cases, the received symbol at the UE 115-$a$ (i.e., from sCell and iCell(s)) may be expressed as:

$$y = \sqrt{\beta_S}\, H_S^{eff} x_S + \sum_{k=1}^{K_{sCell}} \sqrt{\beta_{I,k}}\, H_{I,k}^{eff} x_{I,k} + n, \tag{1}$$

where the transmitted symbol by the sCell and the iCell(s), for a single RE, may be denoted by the random vectors $x_s$ and $x_{I,k}$ for $K_{iCell}$ interfering cells, respectively. In some cases, $\mathbb{X}$ denotes the space of constellations for the transmitted symbol, $x_s \in \mathbb{X}^{N_s}$ and $x_{I,k} \in \mathbb{X}^{N_{I,k}}$, where $k=1, \ldots, K_{iCell}$. Further, $H_S^{eff}$ and $H_{I,k}^{eff}$ may represent the deterministic effective channel matrices, per RE, for the sCell and iCell(s), respectively. In some cases, $\beta_s$ and $\beta_{I,k}$ may represent the TPR for the sCell and iCell(s), respectively, and n may represent a random vector representing background noise, and may be distributed according to a zero-mean complex Gaussian function. In some cases, $P_s$ and $P_{I,k}$, may represent the deterministic MIMO precoding matrices of the sCell and the iCell(s), respectively. Thus, from Eq. (1) it may follow that:

$$y = \sqrt{\beta_S}\, H_S P_S x_S + \sum_{k=1}^{K_{iCell}} \sqrt{\beta_{I,k}}\, H_{I,k} P_{I,k} x_{I,k} + n, \tag{2}$$

In some cases, $H_s$ and $H_{I,k}$ of Eq. (2) may represent the unprecoded channel matrices of the sCell and iCells, respectively. Further, the rank of the unprecoded channel matrices (i.e., number of linearly independent rows or columns) may indicate the number of independent data streams (layers) that can be transmitted simultaneously. It should be noted that Eq. (2) presents a model of the received symbol for a single RE. In some cases, interference cancellation, equalization and joint demodulation may be performed over multiple REs (e.g., on an RB basis). In some cases, the number of REs per RB may be dependent on the Cyclic Prefix (CP) length, Control Format Indicator (CFI), and the number of Reference Symbols (RS). Thus, Eq. (2) may be generalized as:

$$y(i) = \sqrt{\beta_S}\, H_S(i) P_S x_S(i) + \sum_{k=1}^{K_{iCell}} \sqrt{\beta_{I,k}}\, H_{I,k}(i) P_{I,k} x_{I,k}(i) + n, \tag{3}$$

$$i = 1, \ldots, K_{RB}.,$$

In some cases, the TPR $\beta_s$ of the sCell may be given by a function of two parameters, $P_A$ and $P_B$, which may be dependent on data RE positions with respect to an OFDM index within each TTI. Further, parameters $P_A$ and $P_B$ may be specific to UE 115-$a$ and the sCell served by base station 105-$a$, respectively, and may be decoded from SIB2 (e.g., received via the PDSCH). Further, the precoding matrix $P_s$ of the sCell may be known either explicitly by decoding the DCI of the PDCCH, or implicitly from the CSF. In some cases, the demodulator front-end of the UE 115-$a$ may be capable of estimating the unprecoded channel matrices $H_s$ and $H_{I,k}$ of the sCell and the one or more iCells, thus, $\beta_{I,k}$ and $P_{I,k}$ of the iCells may be the unknown parameters from Eq. (3).

In some cases, the pseudo-inverse of the iCell's channel matrix may be represented by: $Z_I(i)$, such that $Z_I(i)H_I(i) = I_{M \times M}(i)$, where $I_{M \times M}$ denotes the M×M identity matrix. As previously described, utilizing the unit-norm property of the interfering cell's precoding matrix may allow for estimating the TPR, followed by evaluating the log-likelihood function for the spatial schemes hypotheses, instead of evaluating the log-likelihood function for the TPR and spatial scheme hypothesis. In some cases, the pseudo-inverse of the iCell's channel matrix may be multiplied to the function representing the observed symbols (i.e., $y(i)$), shown below in Eq. (4).

$$Z_I(i) y(i) = \sqrt{\beta_S}\, Z_I(i) H_S(i) P_S x_S(i) + \sqrt{\beta_I}\, (Z_I(i) H_I(i)) P_I x_I(i) + Z_I(i) n \tag{4}$$
$$= \sqrt{\beta_S}\, Z_I(i) H_S(i) P_S x_S(i) + \sqrt{\beta_I}\, P_I x_I(i) + Z_I(i) n,$$
$$i = 1, \ldots, K_{RB}.,$$

In some cases, taking the $l_2$-norm may lead to Eq. (5).

$$\|Z_I(i)y(i)\|_2^2 = \left\| \sqrt{\beta_S}\, Z_I(i) H_S(i) P_S x_S(i) + \sqrt{\beta_I}\, P_I x_I(i) + Z_I(i) n \right\|_2^2 \tag{5}$$
$$= \beta_S \|Z_I(i) H_S(i) P_S x_S(i)\|_2^2 + \beta_I \|P_I x_I(i)\|_2^2 + \|Z_I(i) n\|_2^2 +$$
$$2\sqrt{\beta_S \beta_I}\, \|Z_I(i) H_S(i) P_S x_S(i)\|_2 \|P_I x_I(i)\|_2 +$$
$$2\sqrt{\beta_S}\, \|Z_I(i) H_S(i) P_S z_S(i)\|_2 \|Z_I(i) n\|_2 +$$
$$2\sqrt{\beta_I}\, \|P_I x_I(i)\|_2 \|Z_I(i) n\|_2,$$

Further, following taking the expected value of both sides of Eq. (5) and using the unit-norm property of the precoding matrix $P_I$ (e.g., Eq. (6)), $$\|P_I\|_f^2 = \text{trace}(P_I P_I^*) = 1 \tag{6},$$

where, $\|\cdot\|_f$ denotes the Frobenius norm, it may follow that:

$$E[\|Z_I(i)y(i)\|_2^2] = \beta_S E[\|Z_I(i) H_S(i) P_S\|_f^2] + \beta_I E[\|P_I\|_f^2] + \sigma_n^2 E[\|Z_I(i)\|_f^2] \tag{7}$$
$$\beta_S E[\|Z_I(i) H_S(i) P_S\|_f^2] + \beta_I + \sigma_n^2 E[\|Z_I(i)\|_f^2].$$

and, the iCell's TPR may be estimated as:

$$\hat{\beta}_I = \frac{1}{K_{RB}} \sum_{i=1}^{K_{RB}} \|Z_I(i) y(i)\|_2^2 - \beta_S \|Z_I(i) H_S(i) P_S\|_f^2 - \sigma_n^2 \|Z_I(i)\|_f^2 \tag{8}$$

In some cases, the channel matrices of the sCell and iCell may be assumed to be constant across all REs with an RB.

In such cases, Eq. (8) may be reduced to provide a closed form solution to estimate the TPR, as shown by Eq. (9) below.

$$\hat{\beta}_I = -\beta_S \|\tilde{Z}_I \tilde{H}_S P_S\|_f^2 - \sigma_n^2 \|\tilde{Z}_I\|_f^2 + \frac{1}{K_{RB}} \sum_{i=1}^{K_{RB}} \|\tilde{Z}_I y(i)\|^2. \quad (9)$$

Figure 3:
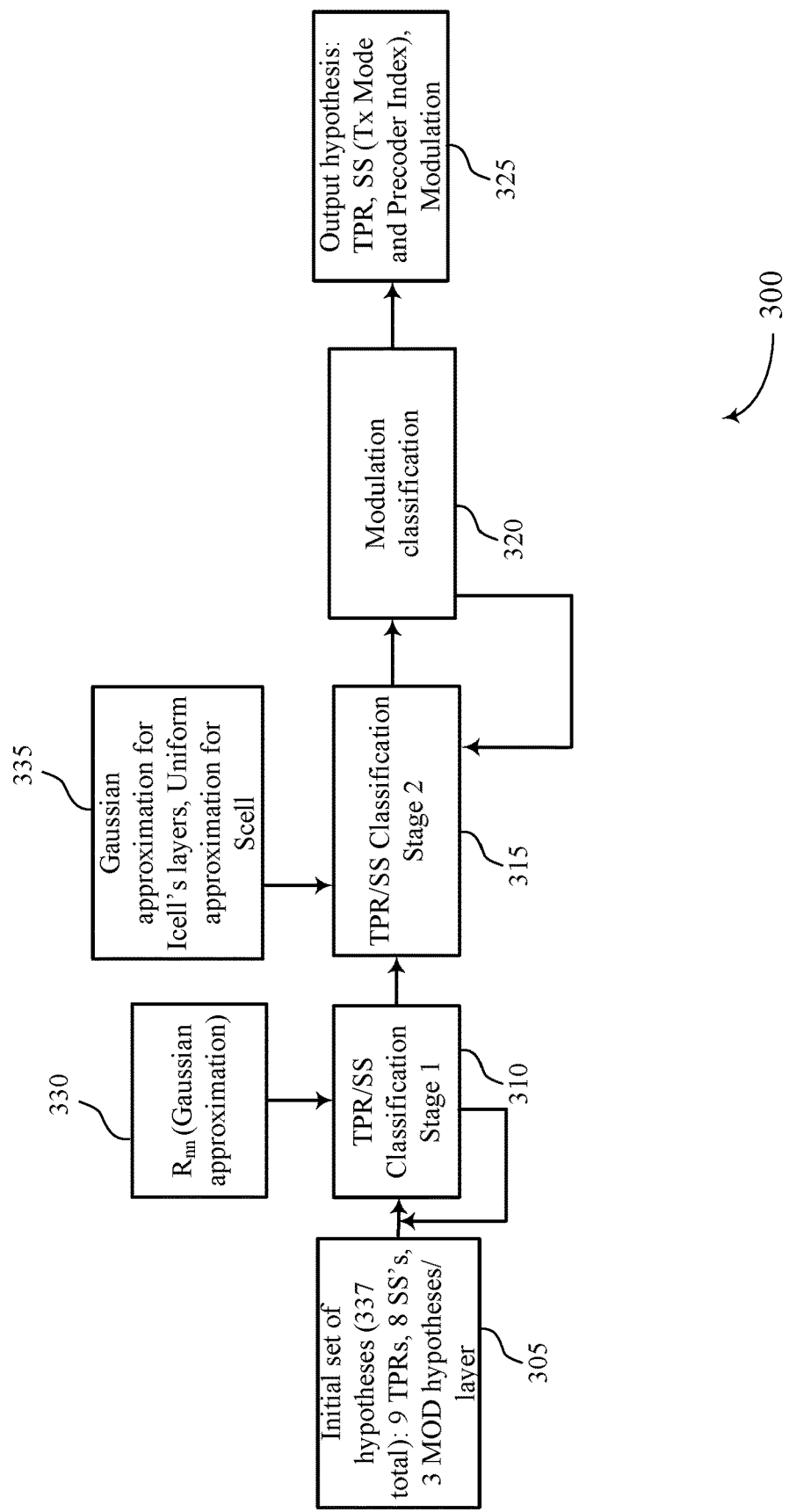
FIG. 3 illustrates an example of a process that supports fast joint traffic-to-pilot ratio and spatial scheme detection in accordance with aspects of the present disclosure.

FIG. 3 illustrates an example of a process 300 that supports fast joint traffic-to-pilot ratio and spatial scheme detection in accordance with aspects of the present disclosure. In some examples, process 300 may be implemented by aspects of wireless communication systems 100 and/or 200. Process 300 may be implemented at a UE 115, which may be an example of a UE 115 described with reference to FIGS. 1 and 2, and may operate in mmW spectrum.

As previously described, in some cases, existing interference cancellation algorithms may suffer from high computational complexity, due to hypothesis testing for the blind detection of dynamic interference parameters of the interfering cell. For instance, while the dynamic interference parameters (e.g., TPR, PMI) of the serving cell may be known to the UE through the aid of network signaling), dynamic interference parameters of the interfering cell may not be transmitted to the UE, for instance, to limit network-signaling load. Hence, the UE may be designed to blindly estimate the dynamic interference parameters of the interfering cell based in part on the received signals. In some cases, such algorithms may solve one or more sub-problems to narrow down hypotheses testing. For instance, such an algorithm may perform four major tasks, namely: i) TPR classification ii) SS classification, iii) precoding classification, and iv) MOD, prior to joint demodulation of the received symbols from the serving and interfering cells.

In some cases, a Bayesian approach may be followed to solve these 4 sub-problems. For instance, detection may be performed by maximizing the posterior probability of the received data under each given hypothesis. The hypothesis space may be large. For example, in LTE-based systems, there may be a total of 9 TPR hypothesis (8 non-zero, and 1 zero to account for the case where the interfering cell is not transmitting data). Further, if the TPR is non-zero, there may be 2 rank hypotheses (R1 and R2), and 4 possible spatial schemes per rank hypothesis. In some cases, there may be 3 modulation hypotheses per MIMO layer, except in the case for Space Frequency Block Code (SFBC), where the transmitted layers may share a common modulation. Thus, as illustrated at 305, process 300 may start with an initial search space of 337 hypotheses, and searching performed by a full-complexity MAP or ML estimator may be resource intensive.

In some cases, in order to reduce algorithmic complexity, the large classification problem may be solved in multiple stages by means of a different algorithm to solve each task, namely: TPR/SS classification stage 1 310, ii) TPR/SS classification stage 2 315, and iii) modulation classification at 320. In some cases, the TPR/SS classification stage 1 310 may have the highest computational complexity, since it may search over a space of 41 hypotheses. In some cases, the TPR/SS classification stage 1 310 may assume the symbols sent by the serving cell and interfering cell as independent standard complex Gaussian random vectors ($R_{nn}$) 330 such that the received signal is a complex Gaussian-distributed random vector with a covariance matrix dependent on the interfering cell's spatial scheme and TPR. In such cases, the log-likelihood function of the observed data may be formed given the TPR and the spatial scheme of the interfering cell. In some cases, to blindly detect the TPR and the spatial scheme of the interfering cell, the log-likelihood function may be evaluated for different permissible pairs of TPR/spatial schemes. In some examples, 1-2 PMIs resulting in the largest likelihood values may be selected and reported together with the estimated TPR. Thus, stage 1 of TPR/SS classification may be used to reduce the set of possible covariance matrices from 41 to 2-8, which may be used by TPR/SS classification stage 2 at 315.

In some cases, a UE may leverage the unit-norm (or unit normal) property of an interfering cell's precoding matrix, and eliminate the effect of the interfering cell's channel matrix. For instance, if the interfering cell's channel matrix is of full rank (rows and columns are linearly independent), the effects of the interfering cell's precoding matrix may be eliminated, and a closed form solution for the TPR may be estimated. As further described below with reference to FIG. 4, instead of evaluating log-likelihood functions for multiple TPR and spatial scheme hypotheses, the UE may only need to evaluate the log-likelihood function for the spatial scheme hypotheses, since the TPR has been estimated. Upper bound and lower bound TPR values may be determined from the estimated TPR, and the log-likelihood function may be evaluated for the upper bound and lower bound TPR values over the set of possible PMI values. In some examples, 1-2 TPR/PMI pairs resulting in the largest likelihood values may be selected by the TPR/SS classification stage 1 and reported to the TPR/SS classification stage 2. For example, if the largest likelihood value is greater than a threshold value over a next largest likelihood value, one TPR/PMI pair may be reported to TPR/SS classification stage 2, while otherwise the two TPR/PMI pairs having the largest TPR/SS values may be reported to TPR/SS classification stage 2.

In some cases, TPR/SS classification stage 2 may be used to detect the interfering cell's PDSCH TPR value (or TPR classification). Further, TPR/SS classification stage 2 may be used to determine if the transmissions from the interfering cell are in a single layer (classified as Transmission Mode 4 Rank 1 (TM4R1) interference), or two layers, in which case modulation classification 320 may be used to determine if the interfering cell is in SFBC, Transmission Mode 3 Rank 2 (TM3R2), or Transmission Mode 4 Rank 2 (TM4R2) mode. In some cases, the TPR/SS classification stage 2 315 may be used to detect the precoding vector if the interfering cell is in TM4R1.

In some cases, TPR/SS classification stage 2 315 may find the spatial scheme and TPR value among the list of hypotheses pre-selected by stage 1 310, which may maximize a suitably defined log likelihood function of the received data over a block of REs. In some cases, TPR/SS classification stage 2 may treat the signal sent by the interfering cell as Gaussian noise 335, such that the transmission scheme of the interfering cell may determine the structure of the noise covariance. Further, stage 2 may assume the serving cell transmissions as uniformly distributed 335 over the serving cell's modulation set. In some cases, stage 2 may then find the TPR/SS hypothesis which may result in a noise covariance conforming most closely to the second order statistics of the received symbols or data. In some cases, unlike in stage 1 where the noise covariance may depend on both the serving cell and the interfering cell, the noise covariance in stage 2 may only depend on the signal transmitted by the interfering cell. Thus, TPR/SS classification stage 2 may allow the detection of the covariance matrix Θ*, which may yield the desired TPR and SS estimates for the interfering cell.

In some cases, modulation classification 320 may be used to detect the SFBC, TM3R2, or TM4R2 (TM classification). Further, modulation classification may detect the precoding matrix of the interfering cell, if in TM4R2 mode (precoding classification) and/or the modulation orders for the two interfering layers. In some cases, TPR/SS classification stage 2 315 may detect that the interfering cell is of rank 2. In such cases, modulation classification may find the rank 2 spatial scheme and modulation hypotheses for the interfering cell that may result in the maximum a posteriori distribution for the received data. Further, during modulation classification the posterior distribution may be formed by taking into account that the signals sent by both the serving cell and the interfering cell belong to finite modulation sets.

In some other cases, the modulation classification may be used instead, at 320, to classify the modulation set if the interfering cell is of rank 1 (i.e., if the SS detected by TPR/SS classification stage 2 is one of the four rank 1 TM modes). Similar to the case when the interfering cell is of rank 1, modulation classification may involve finding the modulation hypothesis for the interfering cell that results in the maximum a posteriori distribution for the received data, which may be formed by taking into account that the signals sent by both the serving cell and the interfering cell belong to finite modulation sets.

Following classification of modulation(s) and/or spatial schemes and the interfering cell's TPR/SS pair, a single hypothesis may be output for the interfering cell, comprising the TPR, SS (transmission mode and precoder index), and modulation (e.g., QPSK, 16-QAM, 64-QAM) at 325, which may allow the UE to cancel transmissions from the interfering cell.

Figure 4:
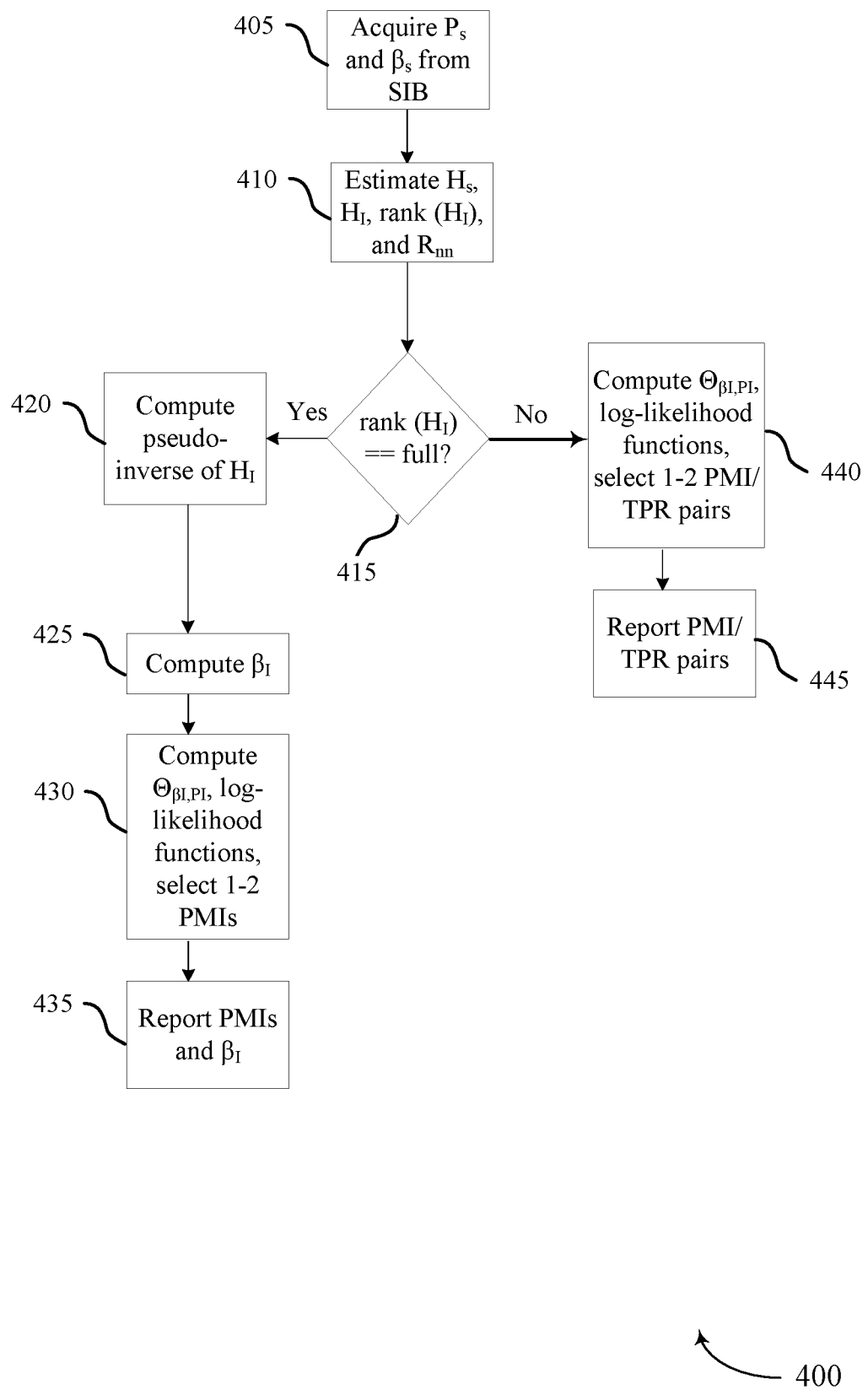
FIG. 4 illustrates an example of a flowchart that supports fast joint traffic-to-pilot ratio and spatial scheme detection in accordance with aspects of the present disclosure.

FIG. 4 illustrates an example of a flowchart 400 that supports fast joint traffic-to-pilot ratio and spatial scheme detection in accordance with aspects of the present disclosure. In some cases, flowchart 400 may be implemented by aspects of wireless communication systems 100 and/or 200. Flowchart 400 illustrates UE 115 behavior while performing interference cancellation. UE 115 may be an example of a UE 115, as described with reference to FIGS. 1 and 2.

At 405, a UE 115 may acquire the TPR ($\beta_s$) and precoding matrix ($P_s$) of the serving cell from a SIB2 of the PDSCH and the DCI of the PDCCH, respectively, as described above with reference to FIG. 2.

At 410, the UE 115 may estimate the unprecoded channel matrices $H_s$ and $H_I$ of the serving cell and the interfering cell (e.g., via reference signals such as Cell-specific Reference Signals (CRS) or Channel State Information Reference Signals CSI-RS). Further, the UE 115 may estimate the noise covariance matrix ($R_{nn}$) based in part on channel/noise estimations, as further described with reference to FIG. 2.

At 415, the UE 115 may proceed to determine if the interfering cell's channel matrix $H_I$ is of full rank. If yes, the UE 115 may leverage the unit-norm property of the interfering cell's precoding matrix, and eliminate the effect of the interfering cell's precoding and channel matrices, for estimation of the interfering cell's TPR. For instance, as described above with reference to FIG. 2, the UE 115 may compute a pseudo-inverse of the interfering cell's channel matrix at 420, followed by a closed-form solution estimate for the interfering cell's TPR ($\beta_I$) at 425. The UE 115 may round the estimate of the interfering cell's TPR to an upper bound TPR estimate (e.g., corresponding to a closest one of the possible TPR values that is higher than the TPR estimate) and a lower bound estimate (e.g., corresponding to a closest one of the possible TPR values that is lower than the TPR estimate). The functions at blocks 420 and 425 may be based on applying a complex random vector model, such as a complex Gaussian, log-normal, or Pareto random vector model, for the serving cell transmission and the interfering cell transmission(s).

In some cases, using the estimated TPR, the UE 115 may evaluate the log-likelihood function of the observed symbols from the serving cell and the interfering cell for a decreased number of PMI hypotheses at 430. For example, the UE 115 may evaluate each PMI hypothesis for each of the upper bound and lower bound estimates from 425. Further, 1-2 PMIs resulting in the largest likelihood values may be selected and reported together (e.g., to a TPR/SS classification stage 2) with the estimated TPR at 435.

In some other cases, if the interfering cell's channel matrix is not full rank (determined at 415), the UE 115 may utilize a hypothesis search TPR/SS classification algorithm at 440. As described above with reference to FIG. 3, the UE may compute the covariance matrix ($\Theta_{\beta_I,PI}$), and log-likelihood functions for 41 hypotheses for detecting the interfering cell's PMI and TPR at 440. Further, 1-2 PMI/TPR pairs resulting in the largest values for the log-likelihood functions may be selected and reported at 445.

Figure 5:
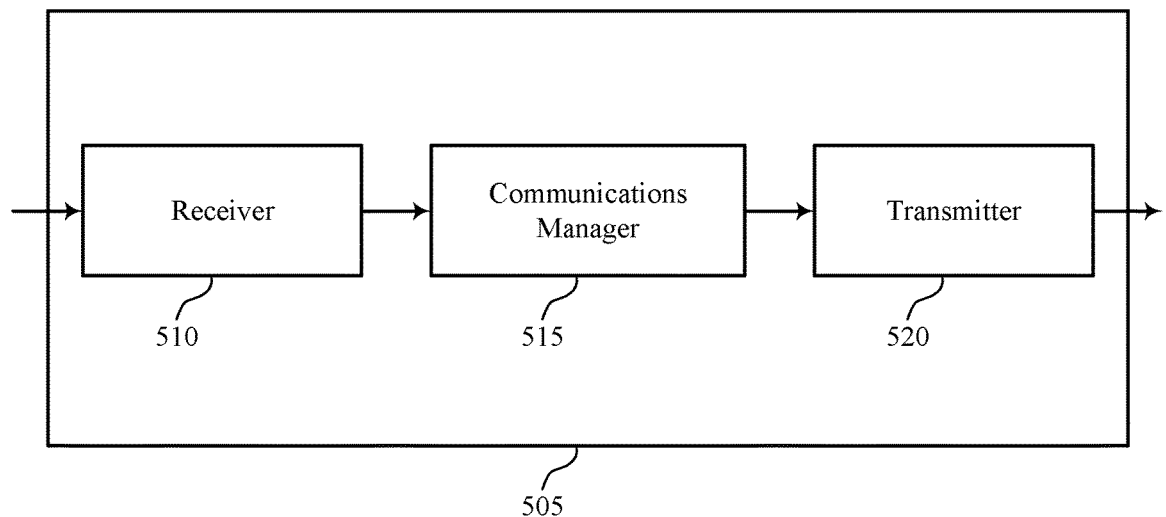
FIGS. 5 through 7 show block diagrams of a device that supports fast joint traffic-to-pilot ratio and spatial scheme detection in accordance with aspects of the present disclosure.

FIG. 5 shows a block diagram 500 of a UE 505 that supports fast joint traffic-to-pilot ratio and spatial scheme detection in accordance with aspects of the present disclosure. UE 505 may be an example of aspects of a UE 115 as described herein. UE 505 may include receiver 510, communications manager 515, and transmitter 520. UE 505 may also include a processor. Each of these components may be in communication with one another (e.g., via one or more buses).

Receiver 510 may receive information such as packets, user data, or control information associated with various information channels (e.g., control channels, data channels, and information related to fast joint traffic-to-pilot ratio and spatial scheme detection, etc.). Information may be passed on to other components of the device. The receiver 510 may be an example of aspects of the transceiver 820 described with reference to FIG. 8. The receiver 510 may utilize a single antenna or a set of antennas.

Communications manager 515 may be an example of aspects of the communications manager 810 described with reference to FIG. 8.

Communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a Digital Signal Processor (DSP), an Application-Specific Integrated Circuit (ASIC), a Field-Programmable Gate Array (FPGA) or other Programmable Logic Device (PLD), discrete gate or transistor logic, discrete hardware components, or any combination thereof designed to perform the functions described in the present disclosure. The communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with various aspects of the present disclosure. In other examples, communications manager 515 and/or at least some of its various sub-components may be combined with one or more other hardware components, including but not limited to an Input/Output (I/O) component, a transceiver, a network server, another computing device, one or more other components described in the present disclosure, or a combination thereof in accordance with various aspects of the present disclosure.

Communications manager 515 may determine a rank of an unprecoded channel matrix associated with an interfering cell, estimate, based on the determined rank, a TPR for an interfering transmission from the interfering cell over time and frequency resources associated with a serving cell transmission from the serving cell, where estimating the TPR of the interfering transmission is based on a unit-norm property of a set of precoding matrix hypotheses for the interfering transmission. Communications manager 515 may calculate, based on the estimated TPR for the interfering transmission, respective log-likelihood functions for joint demodulation of the serving cell transmission and the interfering transmission according to the set of precoding matrix hypotheses, select a subset of the set of precoding matrix hypotheses based on the respective log-likelihood functions, and perform joint demodulation of the serving cell transmission and the interfering transmission to obtain a set of demapped symbols for the serving cell transmission, the joint demodulation being based on a uniform distribution hypothesis for the serving cell transmission and a non-uniform distribution hypothesis (e.g., Gaussian, log-normal, or Pareto distribution hypothesis) for the interfering transmission.

Transmitter 520 may transmit signals generated by other components of the device. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
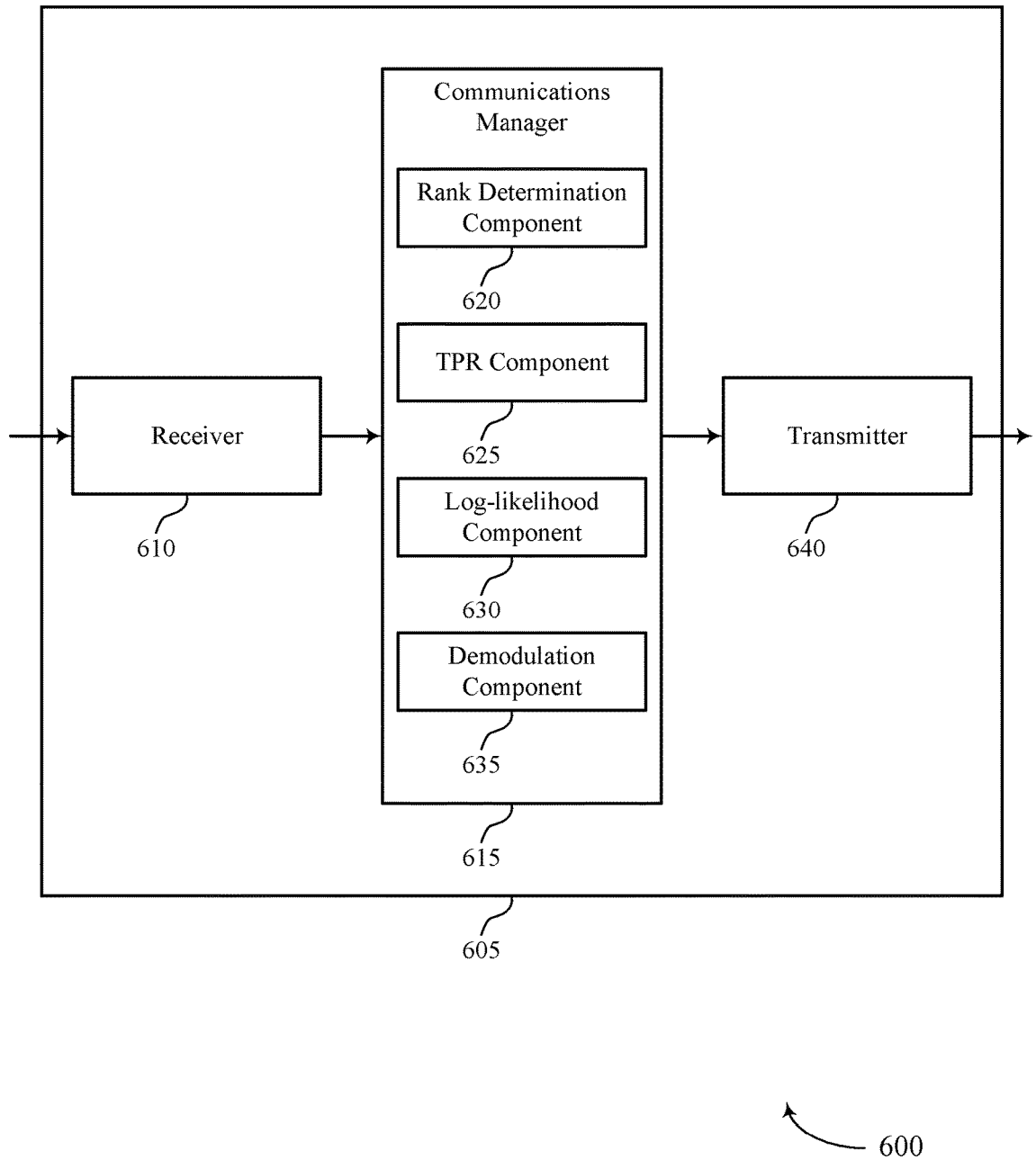

FIG. 6 shows a block diagram 600 of a UE 605 that supports fast joint traffic-to-pilot ratio and spatial scheme detection in accordance with aspects of the present disclosure. UE 605 may be an example of aspects of a UE 505 or a UE 115 as described with reference to FIGS. 1 and 5. UE 605 may include receiver 610, communications manager 615, and transmitter 640. UE 605 may also include a processor. Each of these components may be in communication with one another (e.g., via one or more buses).

Receiver 610 may receive information such as packets, user data, or control information associated with various information channels (e.g., control channels, data channels, and information related to fast joint traffic-to-pilot ratio and spatial scheme detection, etc.). Information may be passed on to other components of the device. The receiver 610 may be an example of aspects of the transceiver 820 described with reference to FIG. 8. The receiver 610 may utilize a single antenna or a set of antennas.

Communications manager 615 may be an example of aspects of the communications manager 810 described with reference to FIG. 8.

Communications manager 615 may also include rank determination component 620, TPR component 625, log-likelihood component 630, and demodulation component 635.

Rank determination component 620 may determine a rank of an unprecoded channel matrix associated with an interfering cell.

TPR component 625 may estimate, based on the determined rank, a TPR for an interfering transmission from the interfering cell over time and frequency resources associated with a serving cell transmission from the serving cell, where estimating the TPR of the interfering transmission is based on a unit-norm property of a set of precoding matrix hypotheses for the interfering transmission.

Log-likelihood component 630 may calculate, based on the estimated TPR for the interfering transmission, respective log-likelihood functions for joint demodulation of the serving cell transmission and the interfering transmission according to the set of precoding matrix hypotheses.

Demodulation component 635 may select a subset of the set of precoding matrix hypotheses based on the respective log-likelihood functions and perform joint demodulation of the serving cell transmission and the interfering transmission to obtain a set of demapped symbols for the serving cell transmission. For example, the joint demodulation being based on a uniform distribution hypothesis for the serving cell transmission and a non-uniform distribution hypothesis for the interfering transmission.

Transmitter 640 may transmit signals generated by other components of the device. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
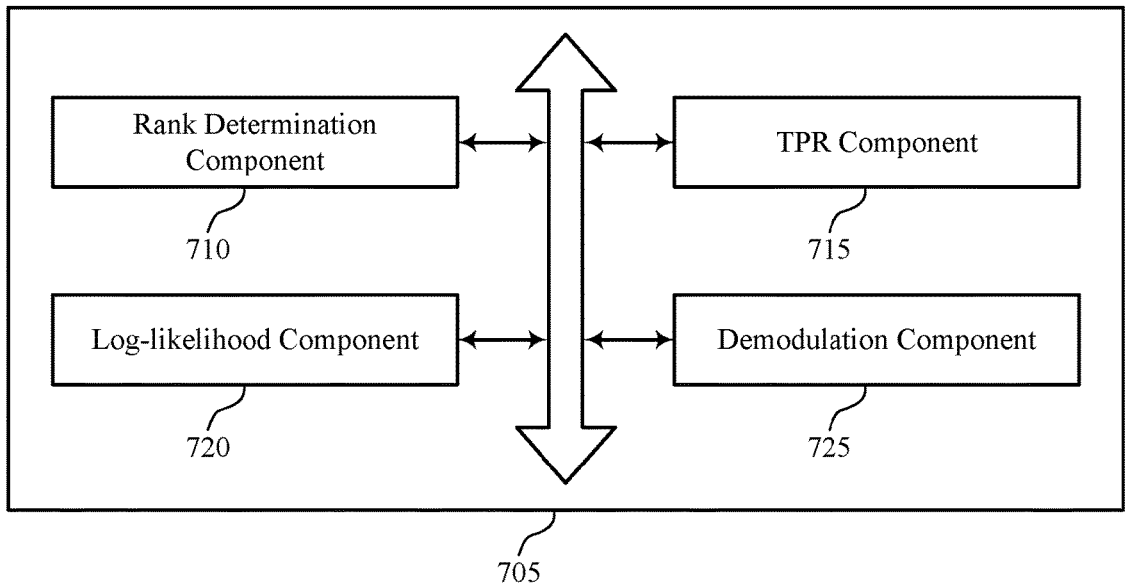

FIG. 7 shows a block diagram 700 of a communications manager 705 that supports fast joint traffic-to-pilot ratio and spatial scheme detection in accordance with aspects of the present disclosure. The communications manager 705 may be an example of aspects of a communications manager 515, a communications manager 615, or a communications manager 810 described with reference to FIGS. 5, 6, and 8. The communications manager 705 may include rank determination component 710, TPR component 715, log-likelihood component 720, and demodulation component 725. Each of these modules may communicate, directly or indirectly, with one another (e.g., via one or more buses).

Rank determination component 710 may determine a rank of an unprecoded channel matrix associated with an interfering cell and determine that a second rank of a second unprecoded channel matrix associated with a second interfering cell does not correspond to a full rank.

TPR component 715 may estimate, based on the determined rank, a TPR for an interfering transmission from the interfering cell over time and frequency resources associated with a serving cell transmission from the serving cell, where estimating the TPR of the interfering transmission is based on a unit-norm property of a set of precoding matrix hypotheses for the interfering transmission. In some cases, TPR component 715 may apply a first complex random vector model (e.g., a complex Gaussian, log-normal, or Pareto random vector model), for the interfering transmission to an observed symbol model over the time and frequency resources, apply a second complex random vector model (e.g., a complex Gaussian, log-normal, or Pareto random vector model) for the serving cell transmission to an observed symbol model over the time and frequency resources, calculate a result of a closed-form equation for the TPR, the closed-form equation applying the unit-norm property of the set of precoding matrix hypotheses to an observed symbol model over the time and frequency resources, round the result of the closed-form equation for the TPR to an upper bound TPR estimate, and round the TPR to a lower bound TPR estimate, select a precoding matrix hypothesis associated with each of the upper bound TPR estimate and the lower bound TPR estimate from the set of precoding matrix hypotheses for the interfering transmission, and report one of the upper bound TPR estimate or the lower bound TPR estimate, and a respective precoding matrix hypothesis for the interfering transmission, based on a maximum of the respective log-likelihood functions. In some cases, the estimating the TPR for the interfering transmission is performed for a set of resource blocks over the time and frequency resources. In some cases, the estimating the TPR for the interfering transmission is based on the rank of the unprecoded channel matrix associated with the interfering cell being a full rank.

Log-likelihood component 720 may calculate, based on the estimated TPR for the interfering transmission, respective log-likelihood functions for joint demodulation of the serving cell transmission and the interfering transmission according to the set of precoding matrix hypotheses, calculate, based on the upper bound TPR estimate and the lower bound TPR estimate, respective log-likelihood functions for joint demodulation of the serving cell transmission and the interfering transmission, calculate, according to the uniform distribution hypothesis for the serving cell transmission and the non-uniform distribution hypothesis for the interfering transmission, second respective log-likelihood functions for joint demodulation of the serving cell transmission and the interfering transmission according to the subset of the set of precoding matrix hypotheses, select a precoding matrix hypothesis for the interfering transmission corresponding to a maximum of the second respective log-likelihood functions, and calculate second respective log-likelihood functions for joint demodulation of a second serving cell transmission and a second interfering transmission from the second interfering cell according to a set of TPR and precoding matrix hypotheses for the interfering transmission, the set of TPR and precoding matrix hypotheses including a second set of precoding matrix hypotheses for each of a set of TPR value hypotheses.

Demodulation component 725 may select a subset of the set of precoding matrix hypotheses based on the respective log-likelihood functions, perform joint demodulation of the serving cell transmission and the interfering transmission to obtain a set of demapped symbols for the serving cell transmission, the joint demodulation being based on a uniform distribution hypothesis for the serving cell transmission and a non-uniform distribution hypothesis for the interfering transmission, select a subset of the set of TPR and precoding matrix hypotheses for the interfering transmission based on the second respective log-likelihood functions, and perform second joint demodulation of the second serving cell transmission and the second interfering transmission to obtain a second set of demapped symbols for the second serving cell transmission.

In some cases, the set of precoding matrix hypotheses for the interfering transmission include a SFBC spatial scheme, a transmit diversity spatial scheme, an open-loop spatial multiplexing spatial scheme, or a closed-loop spatial multiplexing spatial scheme. In some cases, a number of hypotheses in the selected subset of the set of precoding matrix hypotheses for the interfering transmission is determined based on a difference between a highest of the respective log-likelihood functions and a second-highest of the respective log-likelihood functions.

Figure 8:
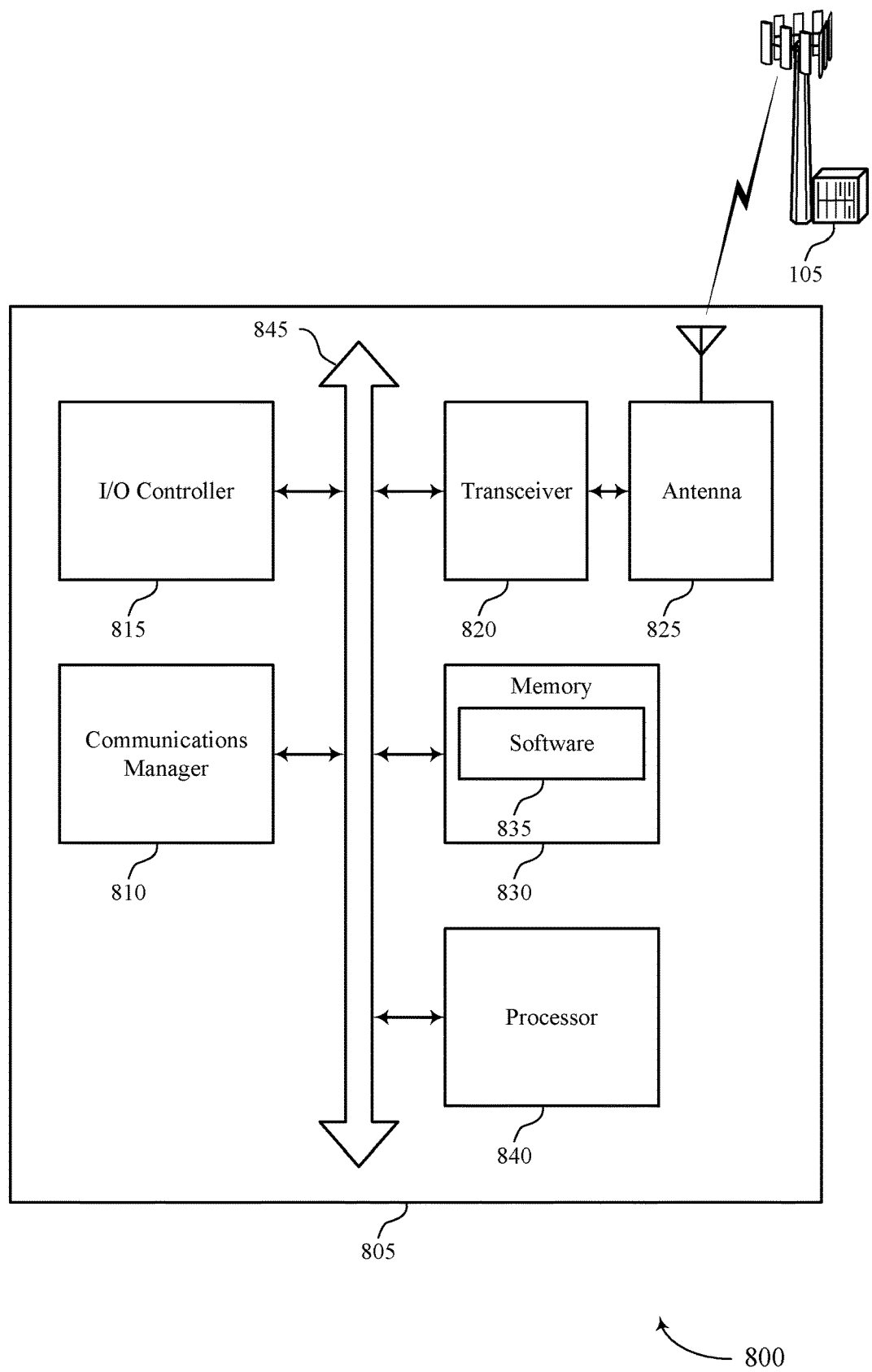
FIG. 8 illustrates a block diagram of a system including a UE that supports fast joint traffic-to-pilot ratio and spatial scheme detection in accordance with aspects of the present disclosure.

FIG. 8 shows a diagram of a system 800 including a device 805 that supports fast joint traffic-to-pilot ratio and spatial scheme detection in accordance with aspects of the present disclosure. Device 805 may be an example of or include the components of UE 505, UE 605, or a UE 115 as described above, e.g., with reference to FIGS. 5 and 6. Device 805 may include components for bi-directional voice and data communications including components for transmitting and receiving communications, including communications manager 810, I/O controller 815, transceiver 820, antenna 825, memory 830, and processor 840. These components may be in electronic communication via one or more buses (e.g., bus 845).

I/O controller 815 may manage input and output signals for device 805. I/O controller 815 may also manage peripherals not integrated into device 805. In some cases, I/O controller 815 may represent a physical connection or port to an external peripheral. In some cases, I/O controller 815 may utilize an operating system such as iOS®, ANDROID®, MS-DOS®, MS-WINDOWS®, OS/2®, UNIX®, LINUX®, or another known operating system. In other cases, I/O controller 815 may represent or interact with a modem, a keyboard, a mouse, a touchscreen, or a similar device. In some cases, I/O controller 815 may be implemented as part of a processor. In some cases, a user may interact with device 805 via I/O controller 815 or via hardware components controlled by I/O controller 815.

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

Memory 830 may include RAM and ROM. The memory 830 may store computer-readable, computer-executable software 835 including instructions that, when executed, cause the processor to perform various functions described herein. In some cases, the memory 830 may contain, among other things, a BIOS which may control basic hardware or software operation such as the interaction with peripheral components or devices.

Processor 840 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, processor 840 may be configured to operate a memory array using a memory controller. In other cases, a memory controller may be integrated into processor 840. Processor 840 may be configured to execute computer-readable instructions stored in a memory to perform various functions (e.g., functions or tasks supporting fast joint traffic-to-pilot ratio and spatial scheme detection).

Figure 9:
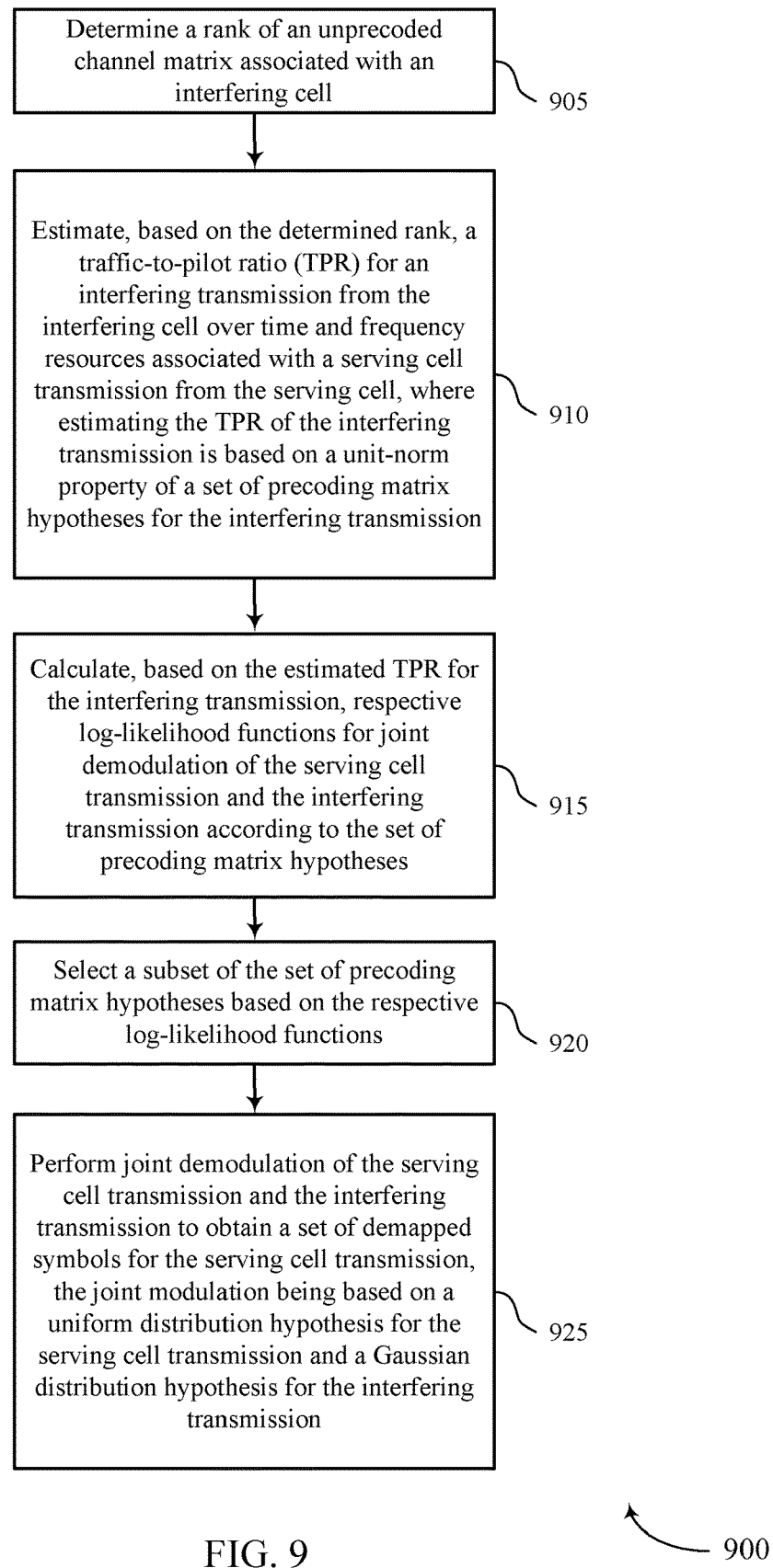
FIG. 9 illustrates a method for fast joint traffic-to-pilot ratio and spatial scheme detection in accordance with aspects of the present disclosure.

FIG. 9 shows a flowchart illustrating a method 900 for fast joint traffic-to-pilot ratio and spatial scheme detection in accordance with aspects of the present disclosure. The operations of method 900 may be implemented by a UE or its components as described herein. For example, the operations of method 900 may be performed by a communications manager as described with reference to FIGS. 5 to 8. In some examples, a UE may execute a set of codes to control the functional elements of the device to perform the functions described below. Additionally or alternatively, the UE may perform aspects of the functions described below using special-purpose hardware.

At 905, the UE may determine a rank of an unprecoded channel matrix associated with an interfering cell. The operations of 905 may be performed according to the methods described herein. In certain examples, aspects of the operations of 905 may be performed by a rank determination component as described with reference to FIGS. 5 to 8.

At 910, the UE may estimate, based on the determined rank, a TPR for an interfering transmission from the interfering cell over time and frequency resources associated with a serving cell transmission from the serving cell, where estimating the TPR of the interfering transmission is based on a unit-norm property of a set of precoding matrix hypotheses for the interfering transmission. The operations of 910 may be performed according to the methods described herein. In certain examples, aspects of the operations of 910 may be performed by a TPR component as described with reference to FIGS. 5 to 8.

At 915, the UE may calculate a result of a closed-form equation for the TPR, the closed-form equation applying the unit-norm property of the set of precoding matrix hypotheses to an observed symbol model over the time and frequency resources. The operations of 915 may be performed according to the methods described herein. In certain examples, aspects of the operations of 915 may be performed by a TPR component as described with reference to FIGS. 5 to 8.

At 920, the UE may calculate, based on the estimated TPR for the interfering transmission, respective log-likelihood functions for joint demodulation of the serving cell transmission and the interfering transmission according to the set of precoding matrix hypotheses. The operations of 920 may be performed according to the methods described herein. In certain examples, aspects of the operations of 920 may be performed by a log-likelihood component as described with reference to FIGS. 5 to 8.

At 925, the UE may select a subset of the set of precoding matrix hypotheses based on the respective log-likelihood functions. The operations of 925 may be performed according to the methods described herein. In certain examples, aspects of the operations of 925 may be performed by a demodulation component as described with reference to FIGS. 5 to 8.

At 930, the UE may perform joint demodulation of the serving cell transmission and the interfering transmission to obtain a set of demapped symbols for the serving cell transmission, the joint demodulation being based on a uniform distribution hypothesis for the serving cell transmission and a non-uniform distribution hypothesis for the interfering transmission. The operations of 930 may be performed according to the methods described herein. In certain examples, aspects of the operations of 930 may be performed by a demodulation component as described with reference to FIGS. 5 to 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a Closed Subscriber Group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise Random-Access Memory (RAM), Read-Only Memory (ROM), Electrically Erasable Programmable ROM (EEPROM), flash memory, Compact Disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, Digital Subscriber Line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, Digital Versatile Disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for interference cancellation performed by a User Equipment (UE) in communication with a serving cell, the method comprising:
   determining a rank of an unprecoded channel matrix associated with an interfering cell;
   estimating, based at least in part on the determined rank, a Traffic-to-Pilot Ratio (TPR) for an interfering transmission from the interfering cell over time and frequency resources associated with a serving cell transmission from the serving cell, wherein estimating the TPR of the interfering transmission is based at least in part on a unit-norm property of a plurality of precoding matrix hypotheses for the interfering transmission;
   calculating, based at least in part on the estimated TPR for the interfering transmission, respective log-likelihood functions for joint demodulation of the serving cell transmission and the interfering transmission according to the plurality of precoding matrix hypotheses;
   selecting a subset of the plurality of precoding matrix hypotheses based at least in part on the respective log-likelihood functions; and
   performing joint demodulation of the serving cell transmission and the interfering transmission to obtain a set of demapped symbols for the serving cell transmission, the joint demodulation being based at least in part on a uniform distribution hypothesis for the serving cell transmission and a non-uniform distribution hypothesis for the interfering transmission.

2. The method of claim 1, wherein the estimating the TPR for the interfering transmission comprises:
applying a complex random vector model for the interfering transmission to an observed symbol model over the time and frequency resources.

3. The method of claim 1, wherein the estimating the TPR for the interfering transmission comprises:
applying a complex random vector model for the serving cell transmission to an observed symbol model over the time and frequency resources.

4. The method of claim 1, wherein the estimating the TPR for the interfering transmission comprises:
calculating a result of a closed-form equation for the TPR, the closed-form equation applying the unit-norm property of the plurality of precoding matrix hypotheses to an observed symbol model over the time and frequency resources.

5. The method of claim 4, further comprising:
rounding the result of the closed-form equation for the TPR to an upper bound TPR estimate, and rounding the TPR to a lower bound TPR estimate;
selecting a precoding matrix hypothesis associated with each of the upper bound TPR estimate and the lower bound TPR estimate from the plurality of precoding matrix hypotheses for the interfering transmission;
calculating, based at least in part on the upper bound TPR estimate and the lower bound TPR estimate, respective log-likelihood functions for joint demodulation of the serving cell transmission and the interfering transmission; and
reporting one of the upper bound TPR estimate or the lower bound TPR estimate, and a respective precoding matrix hypothesis for the interfering transmission, based at least in part on a maximum of the respective log-likelihood functions.

6. The method of claim 1, wherein the performing the joint demodulation of the serving cell transmission and the interfering transmission comprises:
calculating, according to the uniform distribution hypothesis for the serving cell transmission and the non-uniform distribution hypothesis for the interfering transmission, second respective log-likelihood functions for joint demodulation of the serving cell transmission and the interfering transmission according to the subset of the plurality of precoding matrix hypotheses; and
selecting a precoding matrix hypothesis for the interfering transmission corresponding to a maximum of the second respective log-likelihood functions.

7. The method of claim 1, wherein the plurality of precoding matrix hypotheses for the interfering transmission include a space frequency block coding spatial scheme, a transmit diversity spatial scheme, an open-loop spatial multiplexing spatial scheme, or a closed-loop spatial multiplexing spatial scheme.

8. The method of claim 1, wherein the estimating the TPR for the interfering transmission is performed for a plurality of resource blocks over the time and frequency resources.

9. The method of claim 1, wherein the estimating the TPR for the interfering transmission is based on the rank of the unprecoded channel matrix associated with the interfering cell being a full rank.

10. The method of claim 1, wherein a number of hypotheses in the selected subset of the plurality of precoding matrix hypotheses for the interfering transmission is determined based at least in part on a difference between a highest of the respective log-likelihood functions and a second-highest of the respective log-likelihood functions.

11. The method of claim 1, further comprising:
determining that a second rank of a second unprecoded channel matrix associated with a second interfering cell does not correspond to a full rank;
calculating second respective log-likelihood functions for joint demodulation of a second serving cell transmission and a second interfering transmission from the second interfering cell according to a plurality of TPR and precoding matrix hypotheses for the interfering transmission, the plurality of TPR and precoding matrix hypotheses comprising a second plurality of precoding matrix hypotheses for each of a plurality of TPR value hypotheses;
selecting a subset of the plurality of TPR and precoding matrix hypotheses for the interfering transmission based at least in part on the second respective log-likelihood functions; and
performing second joint demodulation of the second serving cell transmission and the second interfering transmission to obtain a second set of demapped symbols for the second serving cell transmission.

12. An apparatus for interference cancellation performed by a User Equipment (UE) in communication with a serving cell, comprising:
means for determining a rank of an unprecoded channel matrix associated with an interfering cell;
means for estimating, based at least in part on the determined rank, a traffic-to-pilot Ratio (TPR) for an interfering transmission from the interfering cell over time and frequency resources associated with a serving cell transmission from the serving cell, wherein estimating the TPR of the interfering transmission is based at least in part on a unit-norm property of a plurality of precoding matrix hypotheses for the interfering transmission;
means for calculating, based at least in part on the estimated TPR for the interfering transmission, respective log-likelihood functions for joint demodulation of the serving cell transmission and the interfering transmission according to the plurality of precoding matrix hypotheses;
means for selecting a subset of the plurality of precoding matrix hypotheses based at least in part on the respective log-likelihood functions; and
means for performing joint demodulation of the serving cell transmission and the interfering transmission to obtain a set of demapped symbols for the serving cell transmission, the joint demodulation being based at least in part on a uniform distribution hypothesis for the serving cell transmission and a non-uniform distribution hypothesis for the interfering transmission.

13. The apparatus of claim 12, wherein the estimating the TPR for the interfering transmission comprises:
means for applying a complex random vector model for the interfering transmission to an observed symbol model over the time and frequency resources.

14. The apparatus of claim 12, wherein the estimating the TPR for the interfering transmission comprises:
means for applying a complex random vector model for the serving cell transmission to an observed symbol model over the time and frequency resources.

15. The apparatus of claim 12, wherein the estimating the TPR for the interfering transmission comprises:

means for calculating a result of a closed-form equation for the TPR, the closed-form equation applying the unit-norm property of the plurality of precoding matrix hypotheses to an observed symbol model over the time and frequency resources.

16. The apparatus of claim 15, further comprising:
means for rounding the result of the closed-form equation for the TPR to an upper bound TPR estimate, and rounding the TPR to a lower bound TPR estimate;
means for selecting a precoding matrix hypothesis associated with each of the upper bound TPR estimate and the lower bound TPR estimate from the plurality of precoding matrix hypotheses for the interfering transmission;
means for calculating, based at least in part on the upper bound TPR estimate and the lower bound TPR estimate, respective log-likelihood functions for joint demodulation of the serving cell transmission and the interfering transmission; and
means for reporting one of the upper bound TPR estimate or the lower bound TPR estimate, and a respective precoding matrix hypothesis for the interfering transmission, based at least in part on a maximum of the respective log-likelihood functions.

17. The apparatus of claim 12, wherein the performing the joint demodulation of the serving cell transmission and the interfering transmission comprises:
means for calculating, according to the uniform distribution hypothesis for the serving cell transmission and the non-uniform distribution hypothesis for the interfering transmission, second respective log-likelihood functions for joint demodulation of the serving cell transmission and the interfering transmission according to the subset of the plurality of precoding matrix hypotheses; and
means for selecting a precoding matrix hypothesis for the interfering transmission corresponding to a maximum of the second respective log-likelihood functions.

18. The apparatus of claim 12, wherein the estimating the TPR for the interfering transmission is based on the rank of the unprecoded channel matrix associated with the interfering cell being a full rank.

19. The apparatus of claim 12, wherein a number of hypotheses in the selected subset of the plurality of precoding matrix hypotheses for the interfering transmission is determined based at least in part on a difference between a highest of the respective log-likelihood functions and a second-highest of the respective log-likelihood functions.

20. The apparatus of claim 12, further comprising:
means for determining that a second rank of a second unprecoded channel matrix associated with a second interfering cell does not correspond to a full rank;
means for calculating second respective log-likelihood functions for joint demodulation of a second serving cell transmission and a second interfering transmission from the second interfering cell according to a plurality of TPR and precoding matrix hypotheses for the interfering transmission, the plurality of TPR and precoding matrix hypotheses comprising a second plurality of precoding matrix hypotheses for each of a plurality of TPR value hypotheses;
means for selecting a subset of the plurality of TPR and precoding matrix hypotheses for the interfering transmission based at least in part on the second respective log-likelihood functions; and
means for performing second joint demodulation of the second serving cell transmission and the second interfering transmission to obtain a second set of demapped symbols for the second serving cell transmission.

21. An apparatus for interference cancellation performed by a User Equipment (UE) in communication with a serving cell, comprising a processor, memory in electronic communication with the processor, and instructions stored in the memory and operable, when executed by the processor, to cause the apparatus to:
determine a rank of an unprecoded channel matrix associated with an interfering cell;
estimate, based at least in part on the determined rank, a traffic-to-pilot ratio (TPR) for an interfering transmission from the interfering cell over time and frequency resources associated with a serving cell transmission from the serving cell, wherein estimating the TPR of the interfering transmission is based at least in part on a unit-norm property of a plurality of precoding matrix hypotheses for the interfering transmission;
calculate, based at least in part on the estimated TPR for the interfering transmission, respective log-likelihood functions for joint demodulation of the serving cell transmission and the interfering transmission according to the plurality of precoding matrix hypotheses;
select a subset of the plurality of precoding matrix hypotheses based at least in part on the respective log-likelihood functions; and
perform joint demodulation of the serving cell transmission and the interfering transmission to obtain a set of demapped symbols for the serving cell transmission, the joint demodulation being based at least in part on a uniform distribution hypothesis for the serving cell transmission and a non-uniform distribution hypothesis for the interfering transmission.

22. The apparatus of claim 21, wherein the estimating the TPR for the interfering transmission comprises:
apply a complex random vector model for the interfering transmission to an observed symbol model over the time and frequency resources.

23. The apparatus of claim 21, wherein the estimating the TPR for the interfering transmission comprises:
apply a complex random vector model for the serving cell transmission to an observed symbol model over the time and frequency resources.

24. The apparatus of claim 21, wherein the estimating the TPR for the interfering transmission comprises:
calculate a result of a closed-form equation for the TPR, the closed-form equation applying the unit-norm property of the plurality of precoding matrix hypotheses to an observed symbol model over the time and frequency resources.

25. The apparatus of claim 24, wherein the instructions are further executable by the processor to cause the apparatus to:
round the result of the closed-form equation for the TPR to an upper bound TPR estimate, and rounding the TPR to a lower bound TPR estimate;
select a precoding matrix hypothesis associated with each of the upper bound TPR estimate and the lower bound TPR estimate from the plurality of precoding matrix hypotheses for the interfering transmission;
calculate, based at least in part on the upper bound TPR estimate and the lower bound TPR estimate, respective log-likelihood functions for joint demodulation of the serving cell transmission and the interfering transmission; and
report one of the upper bound TPR estimate or the lower bound TPR estimate, and a respective precoding matrix hypothesis for the interfering transmission, based at least in part on a maximum of the respective log-likelihood functions.

26. The apparatus of claim 21, wherein the performing the joint demodulation of the serving cell transmission and the interfering transmission comprises:
calculate, according to the uniform distribution hypothesis for the serving cell transmission and the non-uniform distribution hypothesis for the interfering transmission, second respective log-likelihood functions for joint demodulation of the serving cell transmission and the interfering transmission according to the subset of the plurality of precoding matrix hypotheses; and
select a precoding matrix hypothesis for the interfering transmission corresponding to a maximum of the second respective log-likelihood functions.

27. The apparatus of claim 21, wherein the estimating the TPR for the interfering transmission is based on the rank of the unprecoded channel matrix associated with the interfering cell being a full rank.

28. The apparatus of claim 21, wherein a number of hypotheses in the selected subset of the plurality of precoding matrix hypotheses for the interfering transmission is determined based at least in part on a difference between a highest of the respective log-likelihood functions and a second-highest of the respective log-likelihood functions.

29. The apparatus of claim 21, wherein the instructions are further executable by the processor to cause the apparatus to:
determine that a second rank of a second unprecoded channel matrix associated with a second interfering cell does not correspond to a full rank;
calculate second respective log-likelihood functions for joint demodulation of a second serving cell transmission and a second interfering transmission from the second interfering cell according to a plurality of TPR and precoding matrix hypotheses for the interfering transmission, the plurality of TPR and precoding matrix hypotheses comprising a second plurality of precoding matrix hypotheses for each of a plurality of TPR value hypotheses;
select a subset of the plurality of TPR and precoding matrix hypotheses for the interfering transmission based at least in part on the second respective log-likelihood functions; and
perform second joint demodulation of the second serving cell transmission and the second interfering transmission to obtain a second set of demapped symbols for the second serving cell transmission.

30. A non-transitory computer-readable medium storing code for interference cancellation performed by a User Equipment (UE) in communication with a serving cell, the code comprising instructions executable by a processor to:
determine a rank of an unprecoded channel matrix associated with an interfering cell;
estimate, based at least in part on the determined rank, a traffic-to-pilot ratio (TPR) for an interfering transmission from the interfering cell over time and frequency resources associated with a serving cell transmission from the serving cell, wherein estimating the TPR of the interfering transmission is based at least in part on a unit-norm property of a plurality of precoding matrix hypotheses for the interfering transmission;
calculate, based at least in part on the estimated TPR for the interfering transmission, respective log-likelihood functions for joint demodulation of the serving cell transmission and the interfering transmission according to the plurality of precoding matrix hypotheses;
select a subset of the plurality of precoding matrix hypotheses based at least in part on the respective log-likelihood functions; and
perform joint demodulation of the serving cell transmission and the interfering transmission to obtain a set of demapped symbols for the serving cell transmission, the joint demodulation being based at least in part on a uniform distribution hypothesis for the serving cell transmission and a non-uniform distribution hypothesis for the interfering transmission.

* * * * *